No. 804,623.  
PATENTED NOV. 14, 1905.  
J. W. RUGER.  
SHEETER AND BAR PRESS.  
APPLICATION FILED JAN. 27, 1905.

2 SHEETS—SHEET 1.

Witnesses:  
E. R. Rodd  
Chas. S. Lipley

Inventor:  
James W. Ruger  
by V. C. M. Clarke  
his attorney

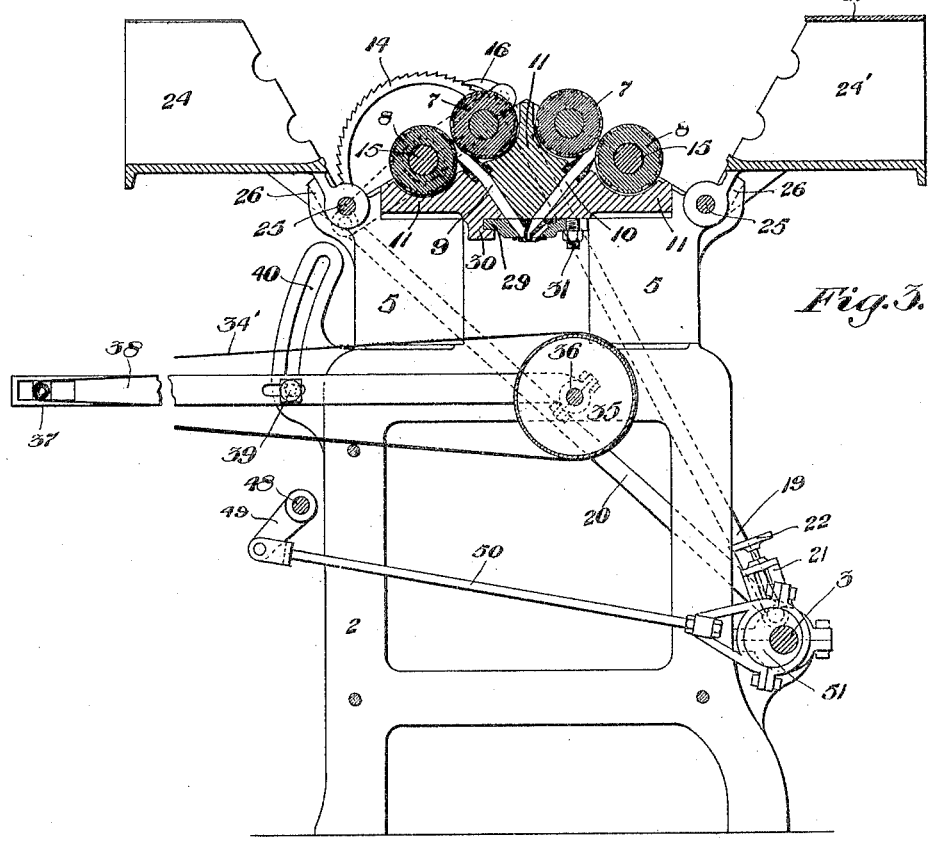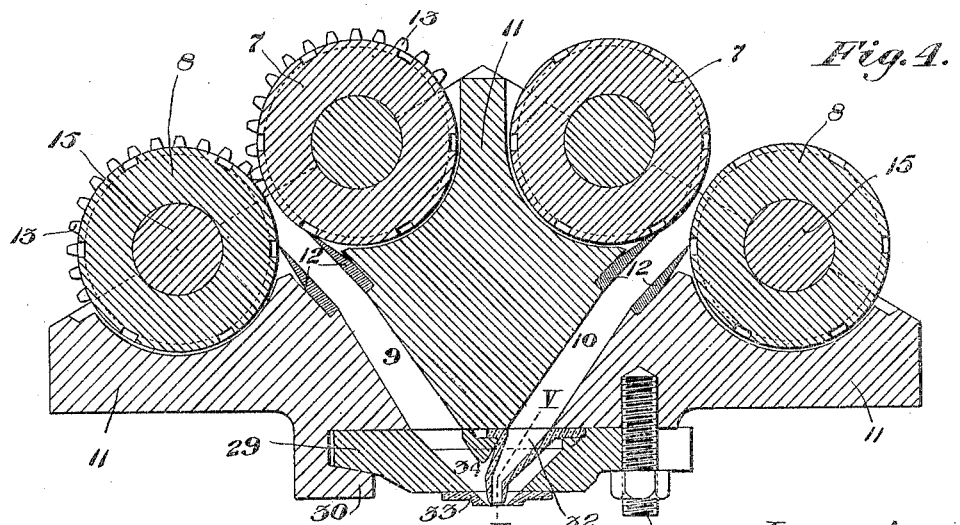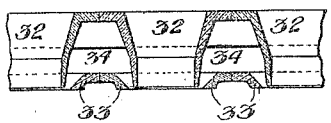

UNITED STATES PATENT OFFICE.

JAMES W. RUGER, OF PITTSBURG, PENNSYLVANIA, ASSIGNOR TO BAIR & GAZZAM MANUFACTURING COMPANY, OF PITTSBURG, PENNSYLVANIA, A CORPORATION OF PENNSYLVANIA.

SHEETER AND BAR-PRESS.

No. 804,623.    Specification of Letters Patent.    Patented Nov. 14, 1905.

Application filed January 27, 1905. Serial No. 242,842.

*To all whom it may concern:*

Be it known that I, JAMES W. RUGER, a citizen of the United States, residing at Pittsburg, in the county of Allegheny and State of Pennsylvania, have invented certain new and useful Improvements in Sheeters and Bar-Presses, of which the following is a specification, reference being had therein to the accompanying drawings, forming part of the specification, in which—

Figure 1:
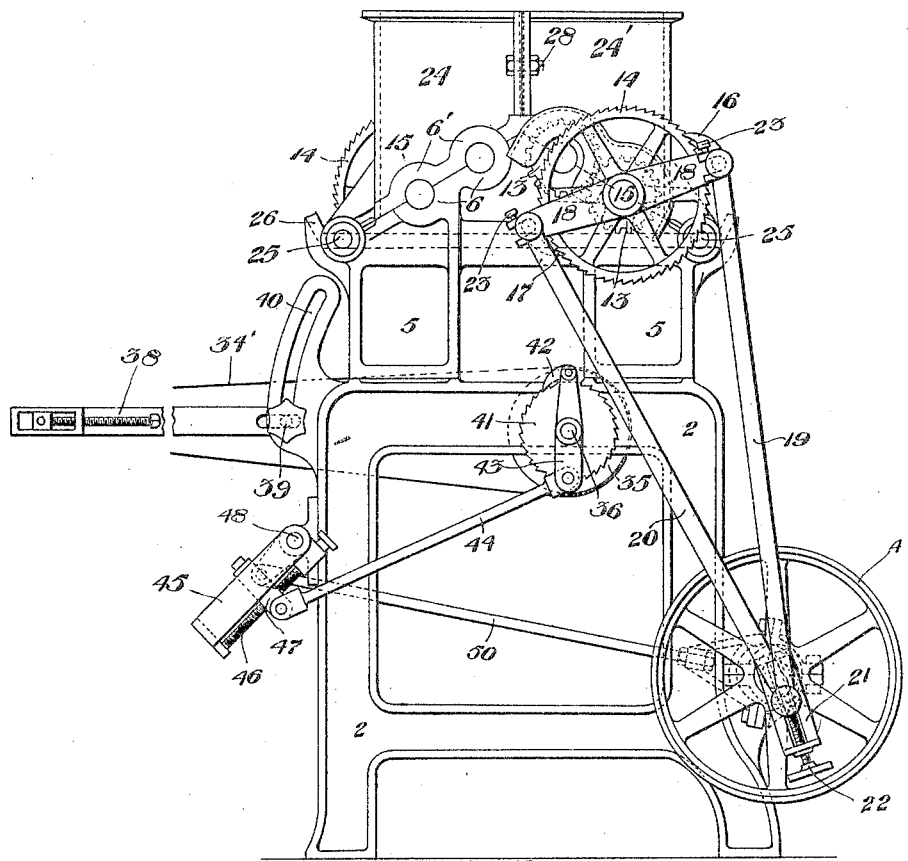
Figure 2:
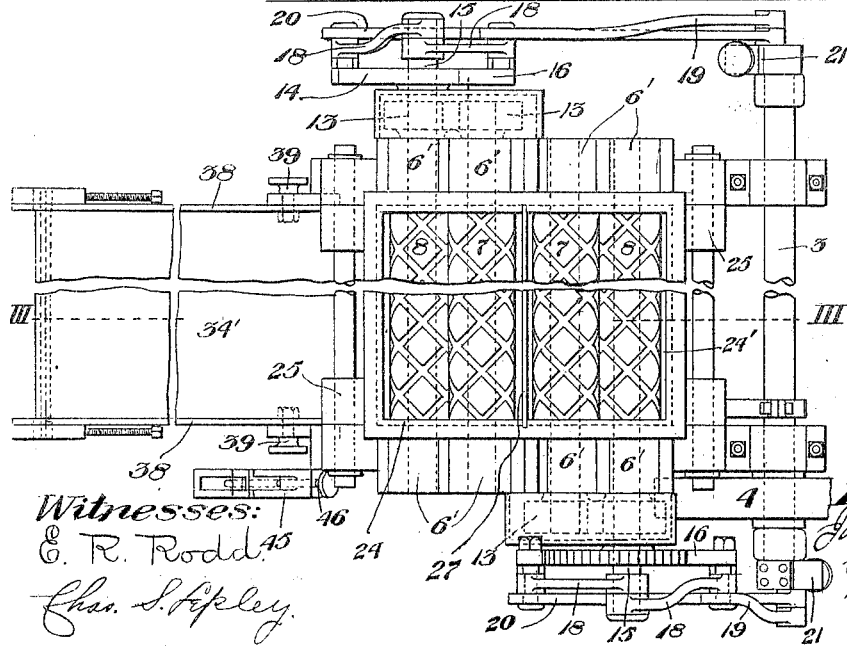

Figure 1 is a view in side elevation of my improved dough-feeding machine. Fig. 2 is a plan view thereof, partly broken away. Fig. 3 is a vertical sectional view indicated by the line III III of Fig. 2, showing the hoppers open. Fig. 4 is an enlarged sectional detail view of the feeding-rolls mounted in their supporting-housings and showing the channels leading to the delivery-openings. Fig. 5 is a detail sectional view on the line V V of Fig. 4, showing adjacent delivery-openings.

My invention consists of an improved sheeter and bar-press, and refers to improvements in machinery for feeding dough. It is particularly adapted to the manufacture of crackers, cakes, &c., wherein it is desired to feed the dough in longitudinal webs or strips upon a receiving-apron adapted to deliver it to the cutting-machine or any other suitable apparatus forming a portion of a bake-shop equipment, the machine being adapted to feed either single webs or strips of a uniform character or consistency or of a composite strip composed of a surrounding inclosing body of dough with an interior filling, as of fruit, &c.

The objects of the present invention are to provide a machine of simple construction having feeding-rolls which are easily accessible for cleaning or removal; also, to arrange the feeding-rolls in positions best adapted to the purpose; also, to provide a separable dough-receiving hopper, so as to be capable of cooperation with the rolls and of being raised away from them without bodily lifting, and, generally, to provide a machine capable of constant continuous operation which will feed regularly and uniformly and which is provided with a delivery-apron adapted to coöperate with the feeding-rolls, so as to carry off the dough as it is forced through the shaping-dies.

Referring to the drawings, 2 represents the main frame of the machine, at the back portion of which is mounted the main shaft 3, having a pulley 4, by which it is driven from a counter-shaft by suitable belt. The pulley 4 may, if desired, be a double tight and loose one, if preferred, to provide for shifting the belt to stop and start the machine.

Mounted upon the main frame 2 are roll-housings 5, having at their upper portions bearings 6, in which are mounted pairs of feeding-rolls 7 8, 7 8, preferably corrugated, as shown, to insure feeding of the dough. The rolls are mounted in pairs, as clearly shown in Figs. 1 and 3, and are arranged in such a manner with relation to the dough-hoppers and to the centrally-arranged feeding-dies that the dough will be fed inwardly and downwardly toward a common point between the contacting faces of each one of each pair of rolls. For this purpose the rolls 8 of each pair are set somewhat below the corresponding rolls 7, as clearly shown, so that a line passing through their centers slopes downwardly toward each side, and such center-intersecting line would pass at right angles through the web of dough being fed by the rolls. For the purpose of receiving the dough fed downwardly by the rolls channels 9 10 are provided, extending downwardly between the walls of filling-blocks 11, mounted between the roll-bearing housings, which filling-blocks preferably closely conform to the revolving peripheries of the rolls. Scraping-knives 12 are secured to the inner sides of such blocks at the upper terminals of channels 9 and 10, adapted to scrape off any adhering dough from the rolls, deflecting it downwardly into the channel, and thus keeping the rolls clean. The pairs of rolls are geared together by toothed pinions 13 13 at opposite ends, as shown in Fig. 2, and each pair of rolls thus geared together is actuated by a ratchet-wheel 14, secured upon the outer end of shaft 15 of roll 8 at each side. Wheel 14 is actuated by alternately-operating push and pull pawls 16 17, mounted in the outer ends of rocker-arm 18, pivoted on shaft 15 and connected by pitmen 19 20 with a crank 21, in which the pitmen are adjustably set with relation to the center of the driving-shaft 3 by a threaded screw 22, as shown in Fig. 1. The same construction is duplicated on the other side of the machine, and it will thus be seen that when shaft 3 is driven each pair of rolls will be actuated by a series of intermittent operations which provide a practically continuous feeding rotation of the rolls. It will be understood that if but one pair of rolls are to be driven and but one of hoppers utilized that the other pair of rolls may be thrown out of service by merely disconnecting the pitmen 19 and 20, for which purpose they are provided with readily-detachable eyes at their upper portions having removable set-screws 23.

24 24' are the hoppers for the dough and interior filling, respectively, each hopper constituting one side, pivoted at 25 upon cross-shafts providing hinged mountings, whereby the hoppers may be thrown outwardly away from the rolls, as shown in Fig. 3, and are provided with upper cap-bearings 6' for the roll-journals. Supporting-lugs 26 extend up from the housings and are adapted to support the hoppers in open position. One of the hoppers is provided at its meeting face with a partition-plate 27, arranged to stand vertically between the hoppers centrally of the machine, and thus to divide the hopper-cavity into two separate spaces, whereby the dough and filling material may be charged separately to each pair of rolls. If preferred, both hoppers may be provided with inner walls, thus constituting entire separable complete box-hoppers, each having side and end walls. The hoppers are connected in their assembled position in any suitable manner, as by bolt or bolts 28, and as thus mounted are capable of easy and quick separation or assemblage in the operation of the machine. At their lower portions the dough-channels 9 10 lead into any suitable dies or dough-forming devices which may be desirable to form different shapes or dimensions of the dough-strip and to form a double—i. e., inner and outer—strip, if desired. To the end that these dies may be readily changed or that substitutions may be quickly made, the lower portion of the blocks 11 are so formed as to receive and retain a die-plate 29, held tightly up against their end faces by any suitable means, as a flange 30 and bolt 31. This die-plate is provided with interior dies 32, having inner channels forming continuations of the main filler-channel 10, and outer dies 33, forming a terminal opening of cavity 34, which also forms a continuation of the main dough-channel 9. By this construction the dough from channel 9 is arranged to envelop and surround and pass outwardly in combination with the inclosed filler, composed of any desired ingredients or mixtures, passing downwardly through channel 10. It will be readily understood that these dies may be of various forms or design and that if it is desired to feed but a single integral strip of dough the single die is all that will be required. However, the machine is designed to furnish the dough in various combinations of ingredients, forming composite strips, and is equipped with numerous sets of dies, as desired, to provide a greater or less variety of product.

34' is a receiving apron or carrier, made of canvas or other suitable material, passing around a roller 35, mounted on shaft 36 in the upper portion of the machine-frame and beneath the delivery-channels, the apron passing around an outer tightening-roll 37, carried in the outer end of a frame 38. This frame may be adjustably set at varying angles by means of securing-bolts 39, passing through slots 40, formed in a guide extending upwardly from the main frame, and the apron is arranged to receive the dough strips and to deliver them outwardly on any suitable receiving apparatus or table, as a cutting-machine. The apron is intermittently actuated at suitable speed by means of a ratchet-wheel 41, actuated by pawl 42, carried by rocker-arm 43, pivoted on shaft 36 of roller 35 and actuated by pitman 44. Pitman 44 is adjustably mounted in a crank 45, in which it may be set in and out with relation to the crank-shaft center by a threaded screw 46, passing through a nut 47, forming the pivotal bearing for the end of the pitman. As this nut is set in or out on the crank the stroke of the pitman and the resulting feed of the operation may be varied. Crank 45 is secured upon one end of shaft 48, actuated through lever-arm 49 and eccentric-rod 50 by eccentric 51, mounted on main shaft 3. By the foregoing arrangement all of the parts are actuated together, so that the entire apparatus is continuously operative and capable of delicate adjustment within wide limits to suit the consistency of the material being operated upon and to provide whatever relative adjustments may be necessary.

The advantages of my invention will be readily appreciated by all those familiar with this class of machinery. The arrangement of the rolls insures proper feeding and direction of the dough, the mounting of the hoppers provides for quickly changing the rolls or of cleaning them, and the entire apparatus will be found to be comparatively simple in construction, reliable in operation, not liable to get out of order, and comparatively economical in first cost and maintenance, while insuring a high degree of uniformity of product.

Changes and variations may be made in the design, construction, and various details of the apparatus by the skilled mechanic; but all such are to be considered as within the scope of the following claims.

What I claim is—

1. A dough-feeding machine provided with an inclined base having semicylindrical journal-bearings, feeding-rolls arranged on different levels and mounted in said bearings, a removable hopper conforming to said base provided with journal-openings, and an inclined delivery-chute leading downwardly and laterally away from said rolls at approximately right angles to a plane passing through the roll centers, substantially as set forth.

2. A dough-feeding machine provided with an inclined base having semicylindrical journal-bearings, feeding-rolls arranged on different levels and mounted in said bearings, and an inclined delivery-chute leading downwardly and laterally away from said rolls at approximately right angles to a plane passing through the roll centers, said chute being provided with a terminal die, substantially as set forth.

3. A dough-feeding machine provided with an inclined base having semicylindrical journal-bearings arranged on different levels, feeding-rolls mounted in said journal-bearings, and a hinged receiving-hopper mounted on said base provided with an inclined lower face and semicylindrical journal clearance-openings, substantially as set forth.

4. A dough-feeding machine provided with an inclined base having semicylindrical journal-bearings arranged on different levels, feeding-rolls mounted in said journal-bearings, an inclined delivery-chute leading downwardly and laterally away from said rolls at approximately right angles to a plane passing through the roll centers, and a hinged receiving-hopper mounted on said base provided with an inclined lower face and semicylindrical journal clearance-openings, substantially as set forth.

5. A dough-feeding machine provided with oppositely-disposed inclined bases having pairs of journal-bearings arranged on different levels, pairs of feeding-rolls mounted in said bearings, and inwardly-sloping delivery-chutes leading from said pairs of rolls toward a common point of delivery, substantially as set forth.

6. A dough-feeding machine provided with oppositely-disposed inclined bases having pairs of journal-bearings arranged on different levels, pairs of feeding-rolls mounted in said bearings, and separable hinged receiving-hoppers mounted on said bases, substantially as set forth.

7. A dough-feeding machine provided with oppositely-disposed inclined bases having pairs of journal-bearings arranged on different levels, pairs of feeding-rolls mounted in said bearings, separable hinged receiving-hoppers mounted on said bases, and inwardly-sloping delivery-chutes leading from said pairs of rolls toward a common point of delivery, substantially as set forth.

8. A dough-feeding machine provided with oppositely-disposed inclined bases having pairs of journal-bearings arranged on different levels, pairs of feeding-rolls mounted in said bearings, separable hinged receiving-hoppers mounted on said bases, and inwardly-sloping delivery-chutes leading from said pairs of rolls toward a common point of delivery, and provided with terminal dies, substantially as set forth.

9. The combination of roll-housings, pairs of feeding-rolls mounted therein located on oppositely-disposed downwardly-inclined planes, double-hinged hoppers provided with roll journal-bearings, inwardly-converging delivery-chutes leading from the rolls to a common point, and a traveling receiving-apron, substantially as set forth.

10. The combination of roll-housings, pairs of feeding-rolls mounted therein located on oppositely-disposed downwardly-inclined planes, double-hinged hoppers provided with roll journal-bearings, inwardly-converging delivery-chutes leading from the rolls to a common point, with inner and outer dies therefor, and a traveling receiving-apron, substantially as set forth.

11. The combination of roll-housings, pairs of feeding-rolls mounted therein located on oppositely-disposed downwardly-inclined planes, double-hinged hoppers provided with roll-journal-bearing caps, inwardly-converging delivery-chutes leading from the rolls to a common point, a traveling receiving-apron, and means for actuating the rolls and apron, substantially as set forth.

12. The combination of roll-housings, pairs of feeding-rolls mounted therein located on oppositely-disposed downwardly-inclined planes, double-hinged hoppers provided with roll-journal-bearing caps, inwardly-converging delivery-chutes leading from the rolls to a common point, a traveling receiving-apron, and means for actuating the rolls and apron at variable speeds, substantially as set forth.

In testimony whereof I affix my signature in presence of two witnesses.

JAMES W. RUGER.

Witnesses:
JAS. J. MCAFEE,
C. M. CLARKE.